Patented Feb. 10, 1931

1,792,410

UNITED STATES PATENT OFFICE

MAX BUCHNER, OF HANOVER-KLEEFELD, GERMANY

PROCESS OF PRODUCING ALUMINA FROM ALUMINIFEROUS SUBSTANCES

No Drawing. Application filed March 7, 1928, Serial No. 259,906, and in Germany December 24, 1926.

I have filed applications for patents in Germany, December 24th, 1926; Germany, January 3rd, 1927; Germany, February 17th, 1927; Germany, February 25th, 1927; Germany, August 24th, 1927; Germany, September 15th, 1927; Germany, October 24th, 1927; Great Britain, December 23rd, 1927; Great Britain, January 3rd, 1928; Great Britain, January 13th, 1928; France, December 24th, 1927; Italy, January 11th, 1928; Yugoslavia, November 9th, 1927; Yugoslavia, December 24th, 1927; Norway, December 23rd, 1927; Austria, December 23rd, 1927; Switzerland, December 24th, 1927; Czechoslovakia, December 31st, 1927; Czechoslovakia, January 3rd, 1928; Czechoslovakia, January 9th, 1928; Hungary, December 24th, 1927; Hungary, January 3rd, 1928; Hungary, January 14th, 1928.

Attempts have been made to prepare aluminium oxide by thermal decomposition of aluminium salts, such as aluminium chloride, aluminium sulphate and ammonia alum. The last mentioned process was found to be economically impracticable. Aluminium sulphate must be decomposed at such a high temperature that the greater portion of the sulphuric acid is decomposed into sulphur dioxide and oxygen, so that it is only possible to recover the sulphuric acid by a complicated method, or by means of expensive apparatus. The decomposition of hydrated aluminium chloride is attended with great technical difficulties and cannot be carried out in a simple, direct manner, owing to the destructive action of the hydrochloric acid.

I have found that nitric acid enables aluminium oxide to be produced from clay and other aluminiferous substances in a very simple and economical manner.

According to my invention alumina is produced from clay and other aluminiferous substances by treating the raw material, which may be previously calcined, for example at temperatures from 550° to 800° C., with nitric acid in vessels made of acid-proof alloys, the resulting solution of aluminium nitrate being separated from the insoluble residue, and the alumina being obtained from the said solution by thermal decomposition. The decomposition of aluminium nitrate can be effected by heating the solution of aluminium nitrate obtained or by heating the solid aluminium nitrate produced from the solution. The oxides of nitrogen evolved are used, if desired, for reforming nitric acid for treating a fresh quantity of raw material.

Examples of suitable acid-proof alloys are alloys of iron, chromium and nickel, alloys containing tungsten and the like, and refined steels.

For decomposing the aluminiferous material it has been found advantageous to treat the damp or air-dry raw material with dilute or concentrated acids. In this way it is possible to minimize the difficulties attending the production of pure alumina, and in particular alumina free from iron. Thus, for example, in the case of a bauxite containing 50% of iron oxide, 98% of the iron present can be dissolved out by simple pretreatment with concentrated hydrochloric acid. The content of aluminium is practically unaffected.

In the same manner the raw material can be treated with nitric acid. The production of the aluminium nitrate solution, that is the extraction of the alumina from the raw material, is preferably carried out by heating the raw material with nitric acid.

According to the nature of the material to be extracted it may be necessary to prolong the heat treatment, in order to obtain a larger yield of alumina.

A particular advantage is the preparing of the solution of aluminium nitrate by treating an excess of aluminiferous material related as to the content of alumina with nitric acid. In spite of the deficiency of nitric acid it is surprising how much more clay passes into solution than would be assumed for the composition of normal aluminium nitrate. When working, for example, at a temperature of 80 to 100° C. about 30 to 40% more aluminium oxide goes into solution than corresponds to the equivalent quantity of nitric acid.

The particular advantage of producing basic aluminium nitrate is that, when using aluminiferous materials containing iron, the elimination of iron occurring simultaneously is so thorough, that the aluminium oxide prepared from basic aluminium nitrate contains only about 1 to 1.5% of $Fe_2O_3$. Probably this is due to the fact that aluminium oxide is dissolved in excess.

If the solution of basic aluminium nitrate, prepared with a deficiency of nitric acid, is allowed to stand for a few hours, or a longer period, or if it is previously cooled, a further reduction of the iron content of the alumina is effected to about 0.7% $Fe_2O_3$. In some circumstances the cooling may be continued until the solution solidifies. I have then found that after crystallizing out the basic aluminium nitrate the elimination of iron has been so thorough, that 100 grams of aluminium oxide prepared from it contains no more than 0.1 to 0.05% of $Fe_2O_3$. The same result is obtained if the solution of basic aluminium nitrate is evaporated to the point of crystallization. The basic aluminium nitrate is also freed from other impurities by a single crystallizing operation. As compared with results obtained with other aluminium salts, particularly with reference to the elimination of iron, basic aluminium nitrate appears to occupy a unique position.

The period of treatment may be considerably reduced, with saving of heat, if the aluminiferous raw material and the nitric acid are first made into a paste, and if the paste is stirred and allowed to stand for a long time at lower temperature, to form a kind of sludge. Then the aluminium nitrate is produced by heat with the addition of further quantities of nitric acid.

Thus if the extraction process is applied to calcined clay, with heat and stirring, but without the pre-treatment with nitric in the cold, a yield of 78% of alumina may be obtained, but if pre-treated in the manner described a yield of 98.7% may result.

Impurities, for example, iron, titanium, etc., may be separated in the course of the process. For example, a high degree of purification may occur when the aluminiferous raw material is treated by nitric acid, with heat and under pressure, with or without prior treatment of the raw material to form a sludge. Thus iron and other impurities may be separated in a surprisingly effective manner, furthermore the decomposition takes place more rapidly and there is a more complete solution of the alumina.

Thus, I have found when bauxite was treated for six hours with nitric acid at 8 atmospheres pressure, and 162° C., about 95% of its content of aluminium oxide was dissolved. Working without the application of pressure, for the same period and at a temperature of 95° C. (a temperature which cannot in practice be exceeded without the application of pressure) only about 75% of the aluminium oxide passed into solution.

The separation of impurities can be effected by other means. If a solution of aluminium nitrate is prepared in the first instance and is subjected to the action of pressure, after removal of the insoluble residue and if desired after being concentrated, the impurities are removed.

It is preferable to carry out this pressure treatment in stages; thus, for example, the mixture of aluminiferous raw material and nitric acid, or the aluminium nitrate solution freed from insoluble residues, may be heated to between 80° and 100° C. the temperatures and pressure being then gradually increased stepwise.

The advantage of heating and raising the pressure in stages is that the apparatus is not subjected for long to the corrosive action of the reagents, as would otherwise be the case.

A further method of removing iron and other impurities is to treat the solution of aluminium nitrate with a concentrated solution of nitric acid or gaseous nitric acid. By treating with nitrate acid in this way the aluminium salt is precipitated. For example, by adding double the quantity of concentrated nitric acid to a cold saturated solution of aluminium nitrate, more than 80% of the aluminium nitrate in solution may be precipitated in the form of fine crystals. Even better results have been obtained by using gaseous nitric acid. After treating the aluminium nitrate solution in this way the impurities remain in solution and can be easily removed.

A high degree of purification, particularly with regard to iron, is thus obtained during the decomposition or treatment of the aluminium nitrate solution, and the last traces can be readily and completely removed in the course of the process if the aluminium nitrate solution, after being concentrated, is treated with potassium ferro-cyanide in concentrated solution or in the solid state. If the solutions are very highly concentrated a precipitate of the ferro-cyanogen compound is obtained, which can be easily filtered off. For efficient precipitation of the iron it is advantageous to apply heat, stir the mixture and keep the reaction neutral.

The ferro-cyanogen compound obtained can be used as a blue pigment, or it may be used for re-forming the original cyanogen compound, for example, by treatment with alkali, ammonia or alkali carbonate. In this way ferric hydroxide and a cyanogen compound are obtained, the latter being used again in the process.

Another method of removing the last traces of iron from the aluminium nitrate solution is to treat it with a thiocyanate. By this treatment iron thiocyanate is formed which can be removed by means of ether. For recovering the residue the ether is evaporated, and the residual iron thiocyanate is treated with an (alcoholic) solution of alkali, ammonia or alkaline carbonate for recovering the thiocyanate.

Even though cyanogen compounds, such as thiocyanogen compounds, have a relatively high market value, it is possible to use them economically in the process as there is no special difficulty in recovering them practically without loss.

The solution of aluminium nitrate obtained by the extraction of the aluminiferous raw material, and partly or completely freed from iron, is used for the production of alumina. The reforming of the nitric acid from the alminium nitrate is important and advantageous. In order to carry out this recovery with a minimum of loss, the solution of aluminium nitrate is first highly concentrated by evaporation in vacuo, till the aluminium nitrate crystals are fused in their water of crystallization. This "melt" is then more strongly heated so that the oxides of nitrogen are evolved in a highly concentrated condition. It is sufficient to work at relatively low temperatures, so that it is possible to use the ordinary apparatus with external application of heat. A rotary kiln may be used.

The indicated temperature conditions are particularly advantageous in practice for the decomposition of aluminium nitrate. For example, temperatures between 300° and 500° C. are quite suitable, but with the operation carried out in two stages, i. e. the removal of water and the decomposition, higher or lower temperatures may be used.

Instead of effecting the removal of basic impurities during the decomposition or extraction, or in addition to doing this, solid aluminium nitrate or a paste of crystals thereof may be produced by evaporation or cooling. This method is particularly advantageous in the case of a solution of basic aluminium nitrate, produced by effecting the decomposition with a deficiency of nitric acid. The removal of iron is particularly thorough if precautions are taken to bring the iron present in the reacting solution into the colloidal form. For example, this may be effected by adding bases, such as aluminium oxide, alkaline earths, or alkalies, to the solution of decomposition products obtained, until the required degree of basicity is obtained. Alternatively the solution may be evaporated until sufficient nitric acid vapour has been driven off to produce the required degree of basicity.

Another method of removing impurities is to evaporate the solution of aluminium nitrate and then to add concentrated or gaseous nitric acid. I have already indicated that by adding concentrated nitric acid aluminium nitrate is precipitated. If the aluminium nitrate solution is simultaneously evaporated, the greater part of the aluminium nitrate in the solution can be crystallized out at a temperature above 47.5° C., and in this way it is obtained in a purer form.

The crystals of aluminium nitrate so obtained are generally washed with nitric acid. It is preferable to wash with concentrated nitric acid, as in this way impurities are removed. Purification is also effected by treating solid aluminium nitrate or a paste of crystals thereof with gaseous nitric acid.

The decomposition of aluminium nitrate may be effected by heating it in the solid, crystallized, or dissolved state, or in the state in which it occurs after the last step in the process, if desired, with the introduction of gases or of water or steam. In this way nitric acid of any desired concentration can be produced.

It is preferable to carry out the evaporation of the aluminium nitrate solution in the presence of air, oxygen and steam, and also neutral gases (nitrogen, carbon dioxide), and it is equally advantageous to effect the decomposition of the aluminium nitrate with the introduction of gases, whether the heating and decomposition are effected in one operation or in two steps, and whether the action is carried out in vacuo, in partial vacuo or under pressure.

It has been found preferable to effect the decomposition of the aluminium nitrate in vacuo. The decomposition into aluminium oxide and nitric acid then takes place easily and steadily at relatively low temperatures, and nitric acid of very high concentration is readily produced.

In this way about 92% of the nitric acid in the aluminium nitrate can be recovered, therefore nitrous gases are formed only in small quantity. Even at 145° C., 75% of the nitric acid may be distilled over, and the remainder at about 200°. These remarkably good results are obtainable at an absolute pressure of 220 mms.

The preparation of alumina from aluminium nitrate can be carried out by decomposition in vacuo, equally well whether the aluminium nitrate is in crystalline or dissolved condition, or if free nitric acid is present during the decomposition. The degree of concentration of the nitric acid obtained in addition to aluminium oxide is of course dependent on the water present, or the water formed by decomposition. If aluminium nitrate containing very little water is to be decomposed, and if it is desired to produce nitric acid of a given concentration it is necessary to add the requisite quantity of water, or to introduce steam during the distillation.

The decomposition of aluminium nitrate in vacuo can be effected also in presence of free nitric acid.

Furthermore it is very favourable to the decomposition of the aluminium nitrate to have alumina present. The decomposition proceeds in such manner that as the nitric acid is distilled off aluminium nitrates of increasing basicity are formed. The basic aluminium nitrate swells up when heated, forming films and viscous, greasy bodies, which resist the conduction of heat. By adding alumina to the decomposition nitrate this is avoided. For example, a substance containing a high percentage of alumina may be added to the nitrate in the proportion of one part to two parts. The alumina may, however, be added to the evaporated solution of aluminium nitrate, and the mixture decomposed. Another method is the spraying of the evaporated solution of aluminium nitrate mixed with alumina.

Another method of decomposing the aluminium nitrate is to introduce the material to be decomposed into a suitable "melt" or into a liquid of suitable boiling point, if necessary with agitation, and to distill off the oxides of nitrogen at the required decomposition temperature and at atmospheric pressure, or under partial vacuum, with the introduction of steam, air, oxygen or gas.

The advantages of the introduction of steam or gases, are that the partial pressure can be reduced and that more complete conversion of the decomposing gases into nitric acid is obtained. By carrying out the decomposition in a melt or liquid at the required temperature better heat transference is obtained. Suitable materials for the melt are molten salts which are stable at the required temperature, or molten metals. Organic liquids are also suitable. The nitrate to be decomposed is also incorporated in the melt.

Under the conditions mentioned the decomposition in the melt proceeds uniformly and completely, and much more uniformly than with other methods of decomposition. It is probable that the melt at least in some cases also acts as a catalyst.

It is a great advantage that practically no nitrous gases are formed, as this would give rise to a loss of nitric acid.

For example, sodium nitrate may be used as a melt. As this salt melts at slightly above 300° C. it forms a suitable melt (heating bath), and enables the decomposition of the aluminium nitrate to be rapidly and thoroughly effected in simple apparatus, such as a boiler having stirring means. When steam is introduced, or water added, nitric acid and aluminium oxide result, the latter in heavy, granular form, which after completion of the reaction and upon treating the melt with water, sinks to the bottom of the aqueous solution. Thus the separation of the aluminium oxide in the melt is simplified, the upper portion of the melt being first decanted from the oxide. The separation of the aluminium oxide from the sodium nitrate is effected by filtration after extraction with water. The resulting solution of sodium nitrate may be evaporated down with aluminium nitrate, to be decomposed and used as a melt for effecting decomposition. A mixture of sodium and potassium nitrates may be used instead of the sodium nitrate. Calcium nitrate, in particular hydrated calcium nitrate, may be used as a melt.

When the decomposition is carried out with the aid of a melt it is convenient to work in vacuo. It is also preferable to introduce gases, for example, steam, for driving out the nitric acid.

As already mentioned in connection with the decomposition of aluminium nitrate in a melt, the introduction of gases during the heating operation is advantageous.

The aluminium oxide obtained by the decomposition may be further purified. It has been shown that any remaining iron compounds or other impurities can be practically wholly removed by treatment with concentrated nitric acid. Alternatively the aluminium oxide obtained by decomposing aluminium nitrate may be dissolved in soda lye, if necessary with the application of heat in an autoclave. The sodium aluminate obtained is filtered and the aluminium separated by precipitation in known manner.

For the extraction of the raw material, for the production of the solutions of aluminium nitrate, dilute nitric acids can be used. Therefore nitric acid used for washing the precipitated aluminium nitrate or the alumina, generally for purifying in course of the process, can be used for extracting or with the heat treatment of the raw material. By evaporating the solution and by decomposition of the aluminium nitrate, highly concentrated or gaseous nitric acid can be reformed in a very simple manner and reused in the process.

All steps of the process can take place in vessels made of acid-proof alloys, thus the extraction or dissolving, the heat treatment, the decomposing-reaction etc.

Examples of suitable acid-proof alloys, already mentioned above, are alloys of iron, chromium and nickel, alloys containing tungsten and the like, and refined steels. It is remarkable that vessels made of such materials permit of treatment under pressure in spite of the presence of nitric acid.

The process enables very pure alumina to be obtained in a very simple manner, and no reagent used need be lost in the form of a valuable but unrecoverable by-product; both the extracting and purifying agents can be recovered in the course of the process, and are repeatedly used in the process. This applies particularly to the nitric acid used for extracting or for the heat treatment of the raw material, and to nitric acid used in the concentrated or gaseous form for removing iron from the aluminium nitrate solution, or from the solid aluminium nitrate, or from the crystalline paste thereof, or for washing the precipitated aluminium nitrate.

Examples 1. 100 kg. of clay calcined at 500° C. are treated with 200 litres of nitric acid of 400 grams per litre strength for four hours at about 80° C., the mixture being stirred. The hot solution is then freed from insoluble residues by means of a suction filter. The filtrate contains about 140 kg. of $Al(NO_3)_3 9H_2O$ in solution, about 2.2 kg. $Fe(NO_3)_3 9H_2O$ and small quantities of alkaline earths and alkalies. All the silicic acid and the titanic acid together with the greater part of the iron remain in the residue. The solution is then evaporated in vacuo and subsequently heated to 500° until the nitrate is completely decomposed. The oxides of nitrogen evolved are collected and are used for a subsequent extraction. There remains 19 kg. of $Al_2O_3$. The resulting alumina, which contains about 0.45 kg. of $Fe_2O_3$, is dissolved in soda lye with or without the application of pressure, and is further treated in known manner, for instance according to Bayer's method. The loss of alkali is thus considerably less than by direct alkaline decomposition of bauxite or clay.

2. 100 kg. of crystals of aluminium nitrate, which are obtained by concentrating the nitrate solution, preferably a solution containing nitric acid as it occurs after the reaction, and which need not be separated from the mother liquor and which contains about 2.2% $Fe_2O_3$ with reference to the $Al_2O_3$), are twice washed in the cold with concentrated nitric acid (sp. gr.=1.4). After this treatment the iron content falls to about 0.5% $Fe_2O_3$, while only traces of aluminium nitrate pass into solution. The resulting nitric acid containing small quantities of iron can be used again for the purifying process or for extraction.

3. 490 kg. of calcined clay, having an alumina content of about 23% are treated with 1000 litres of nitric acid (400 gm. $HNO_3$ per litre) for about four hours at 8 atmospheres pressure and at a temperature of about 160° C. The aluminium nitrate solution produced (containing about 100 kg. of $Al_2O_3$) is practically pure, the iron content in relation to the content of $Al_2O_3$ amounting to only 0.7%.

After separating the residue, the nitric acid used is recovered for a subsequent extraction during the thermal decomposition of the aluminium nitrate.

4. The solution obtained by treating 525 kg. of calcined clay (containing about 23% $Al_2O_3$) with 1000 litres of nitric acid (containing 400 gm. $HNO_3$ per litre) at the ordinary pressure and at a temperature of about 80° C. is separated from the undissolved residue. The solution of aluminium nitrate containing about 102 kg. of $Al_2O_3$, contains iron to the extent of about 2% $Fe_2O_3$ in relation to the quantity of $Al_2O_3$ in solution. This solution after being concentrated is subjected to pressure as set forth in Example 3. A brown precipitate is formed. There is practically no loss of aluminium nitrate from the solution.

The loss amounts to about 1 to 2% of $Al_2O_3$. The quantity of iron in the solution drops to about 0.6% of $Fe_2O_3$ with reference to the amount of $Al_2O_3$ in the solution.

I claim:

1. The method of producing pure alumina, which comprises treating aluminiferous material with nitric acid insufficient to combine with all the alumina in the material, separating the aluminum nitrate solution and dissociating the latter by heat.

2. In the method of producing pure alumina, treating aluminiferous material for several hours with nitric acid insufficient to combine with all the alumina in the material and at a temperature of 80°–100° C.

3. In the method of producing pure alumina, mixing aluminiferous material to a paste with nitric acid, allowing the mixture to stand at a temperature above atmospheric temperature, then adding additional nitric acid, the total acid being insufficient to combine with all the alumina in the material.

4. The method of producing alumina, which comprises treating aluminiferous material under heat and pressure with nitric acid insufficient to combine with all the alumina present, and decomposing the resulting aluminum nitrate into alumina and acid.

5. In the method of producing pure alumina, mixing aluminiferous material and nitric acid insufficient to combine with all the alumina of the material while subjecting it stepwise to increase of heat and pressure, and decomposing the resulting aluminum nitrate by heat.

6. In the process of producing pure alumina, treating aluminiferous material with nitric acid insufficient to combine with all the alumina of the material, separating the solution of aluminum nitrate and decomposing it under a pressure less than atmospheric pressure while heating it.

7. In the process of producing pure alumina, treating aluminiferous material with nitric acid insufficient to combine with all the alumina of the material, separating the solution of aluminum nitrate and decomposing it under a pressure less than atmospheric pressure while heating it in an atmosphere of a gas indifferent to nitric acid.

8. In the process of producing pure alumina, treating aluminiferous material with nitric acid insufficient to combine with all the alumina of the material, separating the solution of aluminum nitrate and decomposing it under a pressure less than atmospheric pressure while heating it in nitric acid.

9. In the process of producing pure alumina, treating aluminiferous material with nitric acid insufficient to combine with all the alumina of the material, separating the solution of aluminum nitrate and decomposing it under a pressure less than atmospheric pressure while heating it in nitric acid and gaseous nitric acid.

10. In the process of producing pure alumina, treating aluminiferous material with nitric acid insufficient to combine with all the alumina of the material, separating the solution of aluminum nitrate and decomposing it under a pressure less than atmospheric pressure, and treating the resulting aluminum oxide with concentrated nitric acid to remove impurities.

11. The process of making pure alumina, which comprises treating aluminiferous material in ferro-chrome-nickel alloy containers with nitric acid insufficient to combine with all the alumina of the material, separating the aluminum nitrate solution and decomposing the nitrate by heat to obtain alumina.

In testimony that I claim the foregoing as my invention, I have signed my name.

Dr. MAX BUCHNER.